United States Patent
Kwak

(10) Patent No.: US 11,248,547 B2
(45) Date of Patent: Feb. 15, 2022

(54) POWERTRAIN ENGINE CONTROL METHOD AND VEHICLE OPERATED THEREBY

(71) Applicant: HYUNDAI AUTOEVER CORP., Seoul (KR)

(72) Inventor: Hye Rim Kwak, Seongnam-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 0 days.

(21) Appl. No.: 16/704,072

(22) Filed: Dec. 5, 2019

(65) Prior Publication Data

US 2020/0182172 A1 Jun. 11, 2020

(30) Foreign Application Priority Data

Dec. 7, 2018 (KR) .................. 10-2018-0157541

(51) Int. Cl.
| F02D 41/00 | (2006.01) |
| F02B 75/02 | (2006.01) |
| G01M 15/06 | (2006.01) |
| G04F 10/04 | (2006.01) |

(52) U.S. Cl.
CPC ............ *F02D 41/009* (2013.01); *F02B 75/02* (2013.01); *G01M 15/06* (2013.01); *G04F 10/04* (2013.01); *F02B 2075/027* (2013.01)

(58) Field of Classification Search
CPC .. F02D 41/009; F02B 75/02; F02B 2075/027; G01M 15/06; G04F 10/04
USPC ......................................................... 701/102
See application file for complete search history.

(56) References Cited

U.S. PATENT DOCUMENTS

| 4,099,495 | A | * | 7/1978 | Kiencke | F02D 41/2403 123/406.65 |
| 4,127,092 | A | * | 11/1978 | Fresow | F02P 5/15 123/406.63 |
| 4,179,922 | A | * | 12/1979 | Bouverie | G01M 15/06 701/102 |
| 4,456,963 | A | * | 6/1984 | Wiggins | G01M 15/08 701/102 |

(Continued)

FOREIGN PATENT DOCUMENTS

| JP | H02-34532 Y2 | 9/1990 |
| JP | 2001-200747 A | 7/2001 |

(Continued)

OTHER PUBLICATIONS

Notice of Allowance dated Feb. 4, 2020 from the corresponding Korean Application No. 10-2018-0157541, 2 pp.

*Primary Examiner* — David Hamaoui
*Assistant Examiner* — John D Bailey
(74) *Attorney, Agent, or Firm* — Lempia Summerfield Katz LLC

(57) ABSTRACT

A powertrain engine control method may include: acquiring period information based on tooth information of an engine crank target wheel by using a timer (T); subdividing the period information by a division rate value (R) by using a timer (D) so as to enable the timer (D) to operate R times; carrying out synchronization with the timer (D) and carrying out counting by using a timer (A) from a zero (0) to 720 degrees for a four-stroke engine operation cycle; and correcting, by using a timer (V), an angle counter which is not generated at the time of deceleration of a vehicle.

10 Claims, 3 Drawing Sheets

(56) References Cited

U.S. PATENT DOCUMENTS

| | | | | | |
|---|---|---|---|---|---|
| 4,499,544 | A | * | 2/1985 | Ohba | F02P 5/1502<br>701/102 |
| 4,667,510 | A | * | 5/1987 | Schroeder | G01M 15/06<br>73/114.28 |
| 4,794,900 | A | * | 1/1989 | Stubs | F02P 3/0456<br>123/406.55 |
| 4,922,874 | A | * | 5/1990 | DeBiasi | F02P 5/1518<br>123/406.65 |
| 5,105,783 | A | * | 4/1992 | Nussbaum | F02P 15/12<br>123/335 |
| 5,237,504 | A | * | 8/1993 | Holmes | G01M 15/11<br>701/102 |
| 5,429,093 | A | * | 7/1995 | Fukui | F02D 41/009<br>123/406.58 |
| 5,842,456 | A | * | 12/1998 | Morganti | F02P 15/08<br>123/606 |
| 5,954,784 | A | * | 9/1999 | Inada | G01M 15/11<br>701/110 |
| 6,041,647 | A | * | 3/2000 | Matsuoka | F02D 41/009<br>123/90.17 |
| 6,341,253 | B1 | * | 1/2002 | Honda | F02D 41/009<br>123/406.62 |
| 7,079,936 | B2 | * | 7/2006 | Honda | F02D 35/023<br>701/102 |
| 2001/0032049 | A1 | * | 10/2001 | Ando | F02D 41/009<br>701/105 |
| 2005/0096865 | A1 | * | 5/2005 | Sugiura | F02D 41/009<br>702/151 |
| 2005/0234631 | A1 | * | 10/2005 | Nomura | F02D 41/003<br>701/102 |
| 2005/0278109 | A1 | * | 12/2005 | Ando | F02D 41/042<br>701/112 |
| 2006/0027215 | A1 | * | 2/2006 | Okochi | F02D 41/009<br>123/492 |
| 2006/0167615 | A1 | * | 7/2006 | Kunibe | F02D 41/222<br>701/114 |
| 2006/0178803 | A1 | * | 8/2006 | Nakamura | F01L 1/352<br>701/114 |
| 2007/0175272 | A1 | * | 8/2007 | Kondo | F02D 41/222<br>73/114.26 |
| 2008/0189024 | A1 | * | 8/2008 | Kondo | F02D 41/009<br>701/102 |
| 2010/0018299 | A1 | * | 1/2010 | Takeuchi | F02D 41/009<br>73/114.26 |
| 2011/0102218 | A1 | * | 5/2011 | Guido | H03M 1/1225<br>341/122 |
| 2011/0102221 | A1 | * | 5/2011 | Guido | H03M 1/1225<br>341/141 |
| 2011/0106415 | A1 | * | 5/2011 | Guido | F02D 41/28<br>701/115 |
| 2016/0202146 | A1 | * | 7/2016 | Enomoto | F02D 41/009<br>73/114.26 |
| 2019/0360407 | A1 | * | 11/2019 | Mikawa | F01L 1/352 |

FOREIGN PATENT DOCUMENTS

| | | |
|---|---|---|
| JP | 2002-242748 A | 8/2002 |
| JP | 2004-339977 A | 12/2004 |
| JP | 2013-104387 A | 5/2013 |
| KR | 10-0335927 B1 | 5/2002 |
| KR | 10-0781879 B1 | 12/2007 |

* cited by examiner

Fig.1 "PRIOR ART"

POWERTRAIN ENGINE CONTROL METHOD AND VEHICLE OPERATED THEREBY

CROSS-REFERENCE TO RELATED APPLICATION

This application claims priority to and the benefit of Korean Patent Application No. 10-2018-0157541, filed on Dec. 7, 2018, the entire contents of which are incorporated herein by reference.

FIELD

The present disclosure relates to a powertrain engine control method and a vehicle operated thereby.

BACKGROUND

The statements in this section merely provide background information related to the present disclosure and may not constitute prior art.

Conventionally, a function block called a digital phase lock loop (DPLL) provided by a central processing unit (CPU) is used to generate an engine position signal for precise control of a powertrain engine controller.

However, we have discovered that the functional block according to the prior art is a functional module block that supports only high-end CPUs, and there is a problem in that low-cost engine controllers requiring precise control based on the engine position signal cannot adapt such a functional block due to the lack of controller price competitiveness.

SUMMARY

The present disclosure provides a powertrain engine precision control method and a vehicle operated thereby. In particular, an engine position signal can be precisely defined by using the general purpose timer provided by a low specification central processing unit and, on the basis of the same, the position information of an engine can accurately corrected.

In addition, the present disclosure provides a method capable of precisely defining an engine position signal by using the combination of the general purpose timer provided by a low-cost CPU and thereby precisely controlling an output signal based on the engine position signal such as injection and ignition of a powertrain engine controller.

According to one aspect of the present disclosure, a powertrain engine precision control method using an engine controller equipped with a central processing unit including a general purpose timer, may comprise: acquiring period information based on tooth information of a crank target wheel using a first timer (T) incorporated in the general purpose timer; subdividing the period information by a division rate value (R) using a second timer (D) so as to enable the second timer (D) to operate times corresponding to the division rate value (R); carrying out synchronization with the second timer (D) and carrying out counting using a third timer (A); and correcting, by a fourth timer (V), an angle counter which is not generated at the time of deceleration of a vehicle.

According to one form of the present disclosure, in acquiring the period information, the first timer (T) can obtain the period information of a corresponding tooth by capturing every one of the tooth information of the crank target wheel, which is the input engine position information.

According to another form of the present disclosure, in subdividing the period information, the second timer (D) sets a timer size by dividing a previous tooth period signal size provided by the first timer (T) by the division rate value (R) for refinement so as to enable the second timer (D) to operate times corresponding to the division rate value (R) on the basis of one crank tooth input signal.

According to other form of the present disclosure, the powertrain engine control method may further comprise: triggering the third timer (A) and the fourth timer (V) by generating an overflow flag, when the second timer (D) reaches a value of zero from a set value.

In one form, the third timer (A) may carry out counting up and the fourth timer (V) carry out counting down according to a trigger signal generated from the third and fourth timers (A), (V).

In addition, the third timer (A) may be set to be reset every zero (0) to 720 degrees and carry out counting in accordance with an engine operation stroke period.

Furthermore, the third timer (A) may carry out counting up by the second timer (D) up to a specified size calculated by equation: $N \times R \times 2$ when a crank carries out two turns. Here, N is a number of teeth of a crank target wheel counted for a predetermined period by the second timer, and R is a division rate value.

According to an aspect of the present disclosure, the fourth timer (V) is set to a size value (R) at which one tooth is divided, and when a next tooth signal is input, it may be checked whether the fourth timer (V) carries out counting times corresponding to the size value (R) of the fourth timer.

In this case, when the fourth timer (V) does not reach a value of 1 at the next tooth signal, the second timer (D) is operated as soon as possible to trigger the third timer (A) and the fourth timer (V) so as to carry out correction such that the third timer (A) produces the specified size (calculated by equation: $N \times R \times 2$) normally during two crank turns.

In addition, the present disclosure may provide a vehicle operated by the powertrain engine control method as described above.

As described above, according to the powertrain engine control method of the present disclosure, by including a period information acquisition step, an operation subdividing step, a counter performing step and a correction step each for carrying out a specific process, it is possible to provide a powertrain engine precision control method, in which an engine position signal may be precisely refined using the general purpose timer provided by a low specification central processing unit and, based thereon, the position information of an engine may be accurately corrected.

In addition, according to the vehicle operated by the powertrain engine control method of the present disclosure, in which an engine position signal may be precisely refined using the general purpose timer provided by a low specification central processing unit and, based thereon, the position information of an engine may be accurately corrected.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
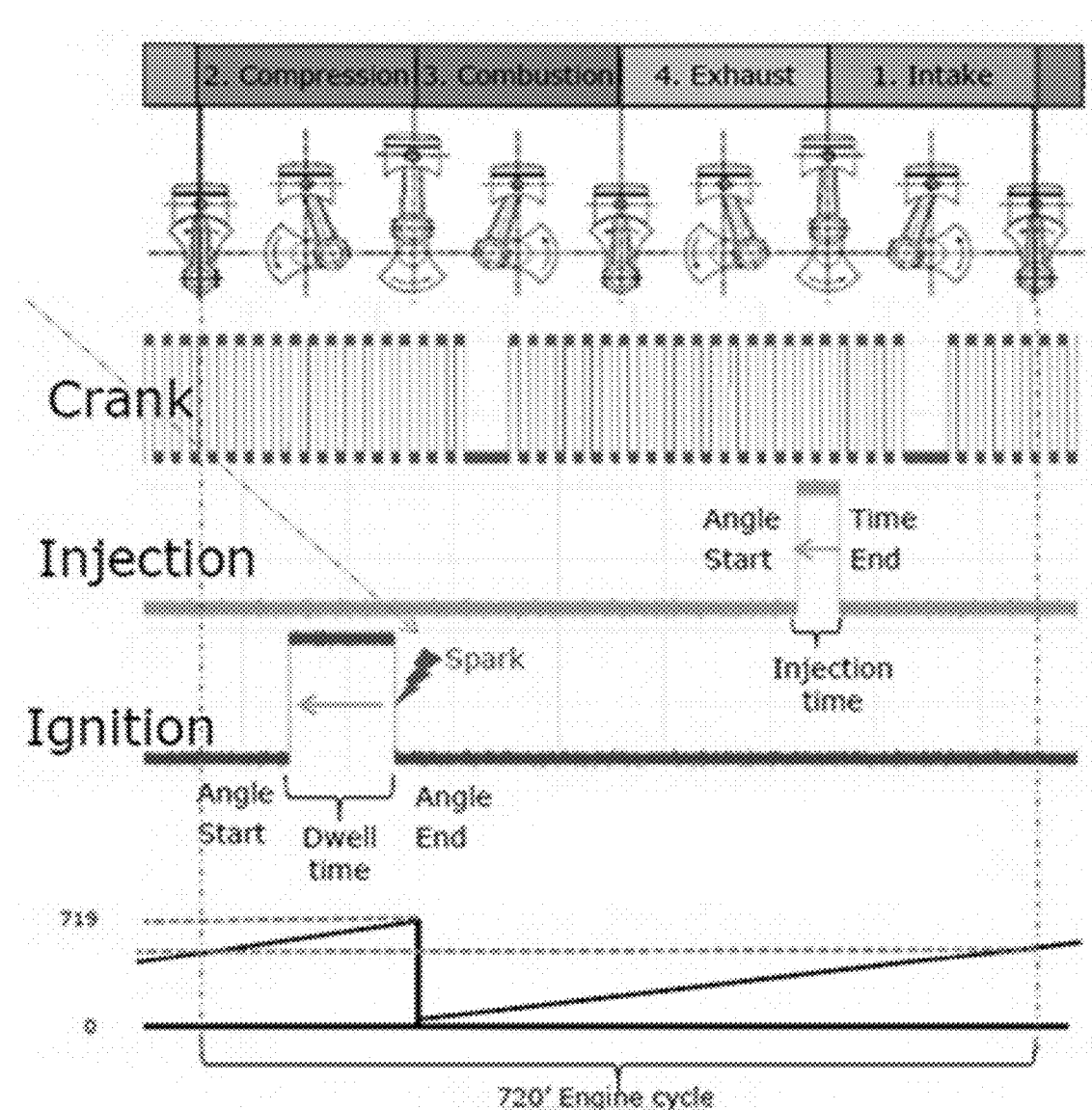
FIG. 1 is a diagram illustrating fuel injection timing and ignition timing according to each stroke of an engine according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Details of the objectives and technical configuration of the present disclosure and the effects thereof will be more clearly understood by the following detailed description based on the accompanying drawings. With reference to the accompanying drawings will be described in detail forms according to the present disclosure.

The forms disclosed herein should not be interpreted or used as limiting the scope of the present disclosure. It is apparent to those skilled in the art that the description, including the forms herein, has a variety of applications. Accordingly, any of the forms described in the detailed description of the present disclosure are illustrative for better understanding of the present disclosure and are not intended to limit the scope of the present disclosure to the forms.

The functional blocks shown in the drawings and described below are only examples of possible implementations. Other functional blocks may be used in other implementations without departing from the spirit and scope of the detailed description. Also, while one or more functional blocks of the present disclosure are represented as separate blocks, one or more of the functional blocks of the present disclosure may be a combination of various hardware and software configurations that perform the same function.

In addition, it should be also understood that the expressions of "including" some components in the specification are open type expressions just to say that components exit and do not exclude additional components.

Furthermore, when some component is referred to as being "connected" or "coupled" to another component, it should be understood that although some component may be directly connected or coupled to another component, other components may exist in between.

Throughout the specification, when some part is "connected" to another part, this includes not only the case in which some part is "directly connected" to another part but also the case in which some part is "electrically connected" to another part through a further component interposed between each of the components. In addition, when some part is said to "include" a certain component, this means that, unless specifically stated otherwise, it may include other components rather than excluding other components.

Figure 2:
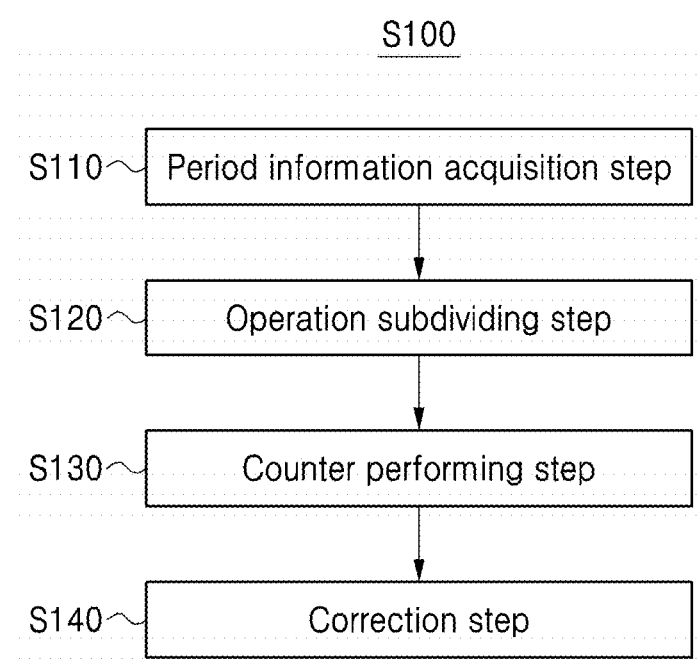
FIG. 2 is a flowchart illustrating a powertrain engine precision control method according to one form of the present disclosure.
Figure 3:
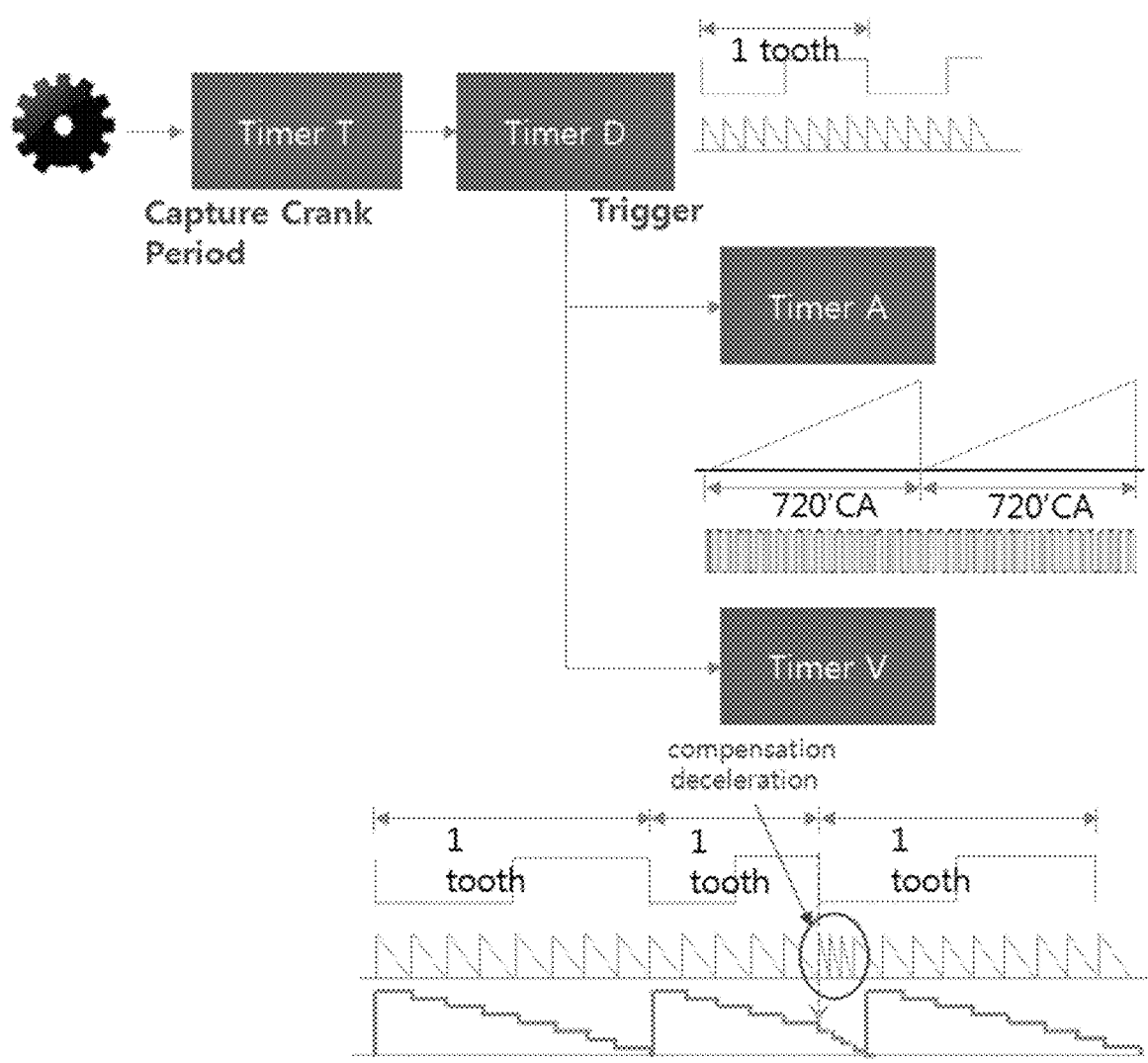
FIG. 3 is a schematic diagram showing an operation state of each timer controlled by the powertrain engine precision control method according to one form of the present disclosure.

FIG. 1 is a diagram illustrating fuel injection timing and ignition timing according to each stroke of an engine according to the prior art, FIG. 2 is a flowchart illustrating a powertrain engine precision control method according to one form of the present disclosure, and FIG. 3 is a schematic diagram showing an operation state of each timer controlled by the powertrain engine precision control method according to one form of the present disclosure.

Referring to these drawings, a powertrain engine precision control method S100 is a method of using a general purpose timer including a timer T, a timer D, a timer A, and a timer V, wherein the method may include a period information acquisition step S110, an operation subdividing step S120, a counter performing step S130, and a correction step S140 each for performing a specific process.

According to the present form including such a configuration, it is possible to provide a powertrain engine precision control method, in which an engine position signal may be precisely refined using the general purpose timer provided by a low specification central processing unit and, based thereon, the position information of an engine may be accurately corrected.

Hereinafter, each component of the powertrain engine precision control method S100 according to exemplary forms will be described in detail.

The period information acquisition step S110 is the step of acquiring period information according to the tooth information of an engine crank target wheel by using the timer T embedded in a general purpose timer.

In one form, the timer T of the period information acquisition step S110 obtains the period information of the tooth by capturing every one of the tooth information of the crank target wheel, which is the engine input position information.

The operation subdividing step S120 is the step of subdividing the period information obtained from the timer T by a division rate value (R) by using a timer (D) that is incorporated in the general purpose timer, thereby enabling the timer (D) to operate R times.

Specifically, the timer D in the operation subdividing step S120 may set a timer size by dividing the previous tooth period signal size provided by the timer T by the division rate value R and enable the timer D to operate R times on the basis of one crank too input signal.

In some implementations, the powertrain engine precision control method S100 may further a timers A and V initiation step for triggering the timer A and the timer V by generating an overflow flag, when the timer D reaches the value of zero from a set value.

In one form, the timer A may carry out counting up and the timer V may carry out counting down according to the trigger signal generated from the timers A and V initiation step. In another form, the timer A is set to be reset to reset every 0 degrees to 720 degrees and to carry out counting in accordance with an engine operation stroke period. At this time, as shown in FIG. 3, the timer A is enabled to carry out counting up by the timer D and can count up to a size N×R×2 when the crank carries out two turns.

Meanwhile, the counter performing step S130 is the step of carrying out counting at 0 to 720 degrees, which is a 4-stroke engine operation cycle, by using the timer A incorporated in the general purpose timer, as shown in FIG. 2 and FIG. 3.

The correction step S140 is the step of correcting an angle counter that is not generated at the time of deceleration of the vehicle by using the timer V incorporated in the general purpose timer.

At this time, the timer V may be set to the size value R at which one tooth is divided, and when a next tooth signal is input, it is possible to check whether the timer V carries out counting R times.

In this case, when the timer V does not reach the value of 1 at the next tooth signal input, the timer D is operated as soon as possible so as to trigger the timer A and the timer V so as to carry out correction such that the timer A produces the size N×R×2 normally during two crank turns.

In addition, the present disclosure may provide a vehicle operated by the powertrain engine precision control method S100.

In addition, according to the vehicle operated by the powertrain engine precision control method of the present disclosure, an engine position signal may be precisely refined using the general purpose timer provided by a low specification central processing unit and, based thereon, the position information of an engine may be accurately corrected.

As described above, according to the powertrain engine precision control method of the present disclosure, by the period information acquisition step, the operation subdividing step, the counter performing step and the correction step each for carrying out the specific process, it is possible to provide the powertrain engine precision control method, in which an engine position signal may be precisely refined using the general purpose timer provided by a low specification central processing unit and, based thereon, the position information of an engine may be accurately corrected.

In addition, according to the vehicle operated by the powertrain engine precision control method of the present disclosure, an engine position signal may be precisely refined using the general purpose timer provided by a low specification central processing unit and, based thereon, the position information of an engine may be accurately corrected, such that it is possible to provide a vehicle capable of stable operation.

BRIEF EXPLANATION OF REFERENCE NUMERALS

S100: Powertrain engine precision control method
S110: Period information acquisition step
S120: Operation subdividing step
S130: Counter performing step
S140: Correction step

What is claimed is:

1. A powertrain engine control method using an engine controller equipped with a central processing unit including a general purpose timer, the control method comprising:
    acquiring, by a first timer, period information based on tooth information of a crank target wheel;
    subdividing the period information by a division rate value using a second timer so as to enable the second timer to operate times corresponding to the division rate value;
    carrying out synchronization with the second timer and carrying out counting using a third timer from a zero (0) to 720 degrees for a four-stroke engine operation cycle; and
    correcting, by a fourth timer, an angle counter which is not generated at a time of deceleration of a vehicle; and
    triggering the third timer and the fourth timer by generating an overflow flag, when the second timer reaches a value of zero from a set value.

2. The control method according to claim 1, wherein in acquiring the period information, the first timer is configured to obtain the period information of a corresponding tooth by capturing every one of input tooth information of the crank target wheel.

3. The control method according to claim 1, wherein in subdividing the period information, the second timer is configured to set a timer size by dividing a previous tooth period signal size provided by the first timer by the division rate value for refinement so as to enable the second timer to operate times corresponding to the division rate value based on one crank tooth input signal.

4. The control method according to claim 1, wherein the third timer is configured to carry out counting up and the fourth timer is configured to carry out counting down based on a trigger signal generated from the third and fourth timers.

5. The control method according to claim 1, wherein the third timer is set to be reset every zero (0) to 720 degrees and configured to carry out counting based on an engine operation stroke period.

6. The control method according to claim 1, wherein the third timer is configured to carry out counting up by the second timer up to a specified size.

7. The control method according to claim 6, wherein the specified size is calculated as: N×R×2 when a crank carries out two turns, where N is a number of teeth of a crank target wheel counted for a predetermined period by the second timer, and R is a division rate value.

8. A powertrain engine control method using an engine controller equipped with a central processing unit including a general purpose timer, the control method comprising:
    acquiring, by a first timer, period information based on tooth information of a crank target wheel;
    subdividing the period information by a division rate value using a second timer so as to enable the second timer to operate times corresponding to the division rate value;
    carrying out synchronization with the second timer and carrying out counting using a third timer from a zero (0) to 720 degrees for a four-stroke engine operation cycle;
    correcting, by a fourth timer, an angle counter which is not generated at a time of deceleration of a vehicle;
    setting the fourth timer to a size value at which one tooth is divided; and
    when a next tooth signal is input, checking whether the fourth timer carries out counting times corresponding to the size value of the fourth timer.

9. The control method according to claim 8, wherein:
    when the fourth timer does not reach a value of 1 at the next tooth signal, the second timer is operated to trigger the third timer and the fourth timer so as to carry out correction such that the third timer produces a specified size, and
    the specified size is calculated as: N×R×2 normally during two crank turns, where a number of teeth of a crank target wheel counted for a predetermined period by the second timer, and R is a division rate value.

10. A vehicle operated by the powertrain engine control method according to claim 1.

* * * * *